US006769666B2

(12) United States Patent
Hall et al.

(10) Patent No.: US 6,769,666 B2
(45) Date of Patent: Aug. 3, 2004

(54) VARIABLE PORT VALVE PLUG

(75) Inventors: Randy J. Hall, Marshalltown, IA (US); Ronald C. Burr, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 124 days.

(21) Appl. No.: 10/145,441

(22) Filed: May 14, 2002

(65) Prior Publication Data

US 2003/0089869 A1 May 15, 2003

Related U.S. Application Data

(60) Provisional application No. 60/335,920, filed on Nov. 15, 2001.

(51) Int. Cl.[7] ............................ F16K 47/00; F16L 55/02
(52) U.S. Cl. ...................................... 251/121; 251/122
(58) Field of Search ................................ 251/121, 122, 251/356

(56) References Cited

U.S. PATENT DOCUMENTS

| | | | | |
|---|---|---|---|---|
| 2,061,852 A | * | 11/1936 | Schweitzer | 251/122 |
| 2,685,294 A | * | 8/1954 | Gold et al. | 137/1 |
| 2,788,570 A | * | 4/1957 | Hoeh | 29/890.131 |
| 3,098,637 A | * | 7/1963 | Baustian | 251/122 |
| 3,125,121 A | | 3/1964 | Muller | 137/614 |
| 4,505,288 A | | 3/1985 | Murphy, Jr. et al. | 137/59 |
| 4,573,489 A | | 3/1986 | Carlton et al. | 137/59 |
| 4,721,284 A | | 1/1988 | Bankard | 251/86 |
| 5,765,814 A | | 6/1998 | Dvorak et al. | 251/127 |

FOREIGN PATENT DOCUMENTS

| | | |
|---|---|---|
| DE | 1 940 941 | 2/1971 |
| DE | 198 02 447 A1 | 8/1999 |
| GB | 1 378 497 | 12/1974 |
| GB | 2 227 366 A | 10/1994 |

OTHER PUBLICATIONS

PCT International Preliminary Examination Report (IPER) issued in PCT/US02/36575.
PCT International Search Report issued in PCT/US02/36575, Feb. 26, 2003.

* cited by examiner

*Primary Examiner*—Edward K. Look
*Assistant Examiner*—John K. Fristoe, Jr.
(74) *Attorney, Agent, or Firm*—Marshall, Gerstein & Borun LLP

(57) ABSTRACT

A valve assembly has a valve body having an inlet passageway and an outlet passageway. A flow orifice is disposed within valve body and provides flow communication between the inlet passageway and outlet passageway. A valve seat cooperates with the flow orifice and a variable port valve plug to open and close the valve. The valve plug has a plug body with a conically-shaped smooth tapered wall, a proximal end, and a domed distal end surface that smoothly transitions into the tapered wall. The valve plug is movable between an open position out of contact with the valve seat and a closed position borne against the valve seat. A maximum open position of the valve plug relative to the valve seat can be selectively changed to vary flow characteristics through the valve assembly.

16 Claims, 3 Drawing Sheets

VARIABLE PORT VALVE PLUG

RELATED APPLICATION DATA

This patent is related to co-pending U.S. Provisional Patent Application Serial No. 60/335,920, which was filed on Nov. 15, 2001.

FIELD OF THE INVENTION

The present invention relates generally to valves, and more particularly to a variable port valve plug that can effectively vary the port size of a valve.

BACKGROUND OF THE INVENTION

Valves are used in a wide range of process control system applications to control various parameters of a media being processed such as a fluid. A wide variety of valve types are known and can include, for example, dump valves, control valves, throttling valves, and the like. Similarly, process and control systems are utilized for handling a myriad of different media.

A typical valve has a media inlet coupled through a flow control or orifice region to a media outlet. A closure device of some kind is typically provided in the flow control region with a portion that is movable to control flow of a media from the valve inlet to the valve outlet. The movable portion is often a valve plug that can be moved to bear against a corresponding fixed seating surface of the closure device to selectively shut off flow of a media through the valve. During operation, it is typical for a control system to operate the valve so that the valve plug is moved toward and away from the valve seat ring between fixed closed and open positions, respectively, in order to control flow through the orifice region and, thus, through the valve.

One type of valve is a sliding stem valve that has a valve plug on the end of an elongate stem that slides along its longitudinal axis toward and away from the valve seat. A combination of the valve plug, valve seat, and valve stem defines what is known as a trim set for a given valve. A valve with a given flow orifice size and geometry has a maximum flow capacity or flow rate. This flow rate can be related to what is termed "flow coefficient" (Cv) used to predict the flow rate through the valve under a standard set of test conditions. The value Cv is the number of U.S. gallons per minute of 60° F. water that will flow through the known valve with a pressure drop of 1 pound per square inch (psi) across the valve.

It is known that a given part of a process control system may require a valve having a particular flow rate or flow capacity. It is further known that other portions of the system may require valves with different flow capacities or flow rates. It is also known that a completely different system may require a valve with a still different flow rate or flow capacity. It is also known that the desired flow rate or flow capacity may change for a given process control system when system parameters change. Thus, valve performance characteristics of the particular system may periodically need to be altered. For all of these circumstances, a variety of valve assemblies and/or valve trim sets must be kept on hand.

In order to achieve changeover from one valve flow rate or capacity to another, one must either remove the entire existing valve and replace it with a completely different valve, or rebuild the existing valve to include a different trim set. For a sliding stem type valve, the valve seat typically defines the flow orifice size, and results in selection of a valve plug size that corresponds to that orifice size. The valve plug typically can only move between the valve closed position and a single, fixed valve open position. Each valve thus can only produce one valve flow rate or capacity. As noted above, in order to change from one flow capacity to another, it is necessary to either change the valve trim set or replace the entire valve assembly.

Significant down time, labor expense, and part cost can occur for a process control system as a result of handling multiple valve assemblies and/or trim sets. This is because it is necessary to manufacture, ship, store, handle, and replace the various trim sets or entire valves when a change in valve characteristics is desired. These disadvantages reduce labor, manufacturing, storage, part handling, and facility efficiency and increase labor cost for a given process control system application where any change in valve flow characteristics is desired or necessary.

In addition, if a conventional valve plug and seat set in a valve were to be used to change the flow capacity of the valve, such as by changing the maximum available travel of the valve plug, flow characteristics through the orifice region would be severely and negatively affected. The characteristics of a conventional trim set are not intended for such applications. Also, if a reduced valve flow capacity using a conventional trim set is attempted by stopping and holding the valve plug closer to the seat in a different valve open position, media flowing through the valve would tend to force the plug toward the valve seat because the plug would be positioned too close to the seat. This would cause bi-stable flow and vibration in the valve assembly.

BRIEF DESCRIPTION OF THE DRAWINGS

Objects, features, and advantages of the present invention will become apparent upon reading the following description in conjunction with the drawing figures, in which.

DETAILED DESCRIPTION OF THE PREFERRED EMBODIMENTS

A variable port valve plug for a valve is disclosed that can eliminate or significantly reduce the need for manufacturing, maintaining, and replacing different trim sets for the valve. The disclosed valve plug is suitable for many different types of valves. The disclosed example is described with reference to what is known as a sliding stem type valve construction. However, the disclosed plug is equally well suited for many other types and constructions of valves, such as, for example, control valves, throttling valves, or the like. The present disclosure is not intended to be limited to a particular valve type. The disclosed valve construction is also suitable for use with many different types of media.

The disclosed variable port valve plug has a shape and contour such that the plug can be positioned relative to a valve seat in a selected one of a plurality of permissible maximum travel positions. In any one of the selectable positions, the variable port valve plug disclosed herein prevents undesirable flow characteristics through the orifice region of the valve and yet changes the flow capacity of the valve. The variable port valve plug can be selectively positioned relative to the seat ring to effectively produce a selected capacity for the valve without having to swap portions of the trim set such as the valve plug and/or the valve seat. The position of the valve plug can be controlled to limit the maximum travel of the valve plug, i.e. its valve open position, as desired.

Figure 1:
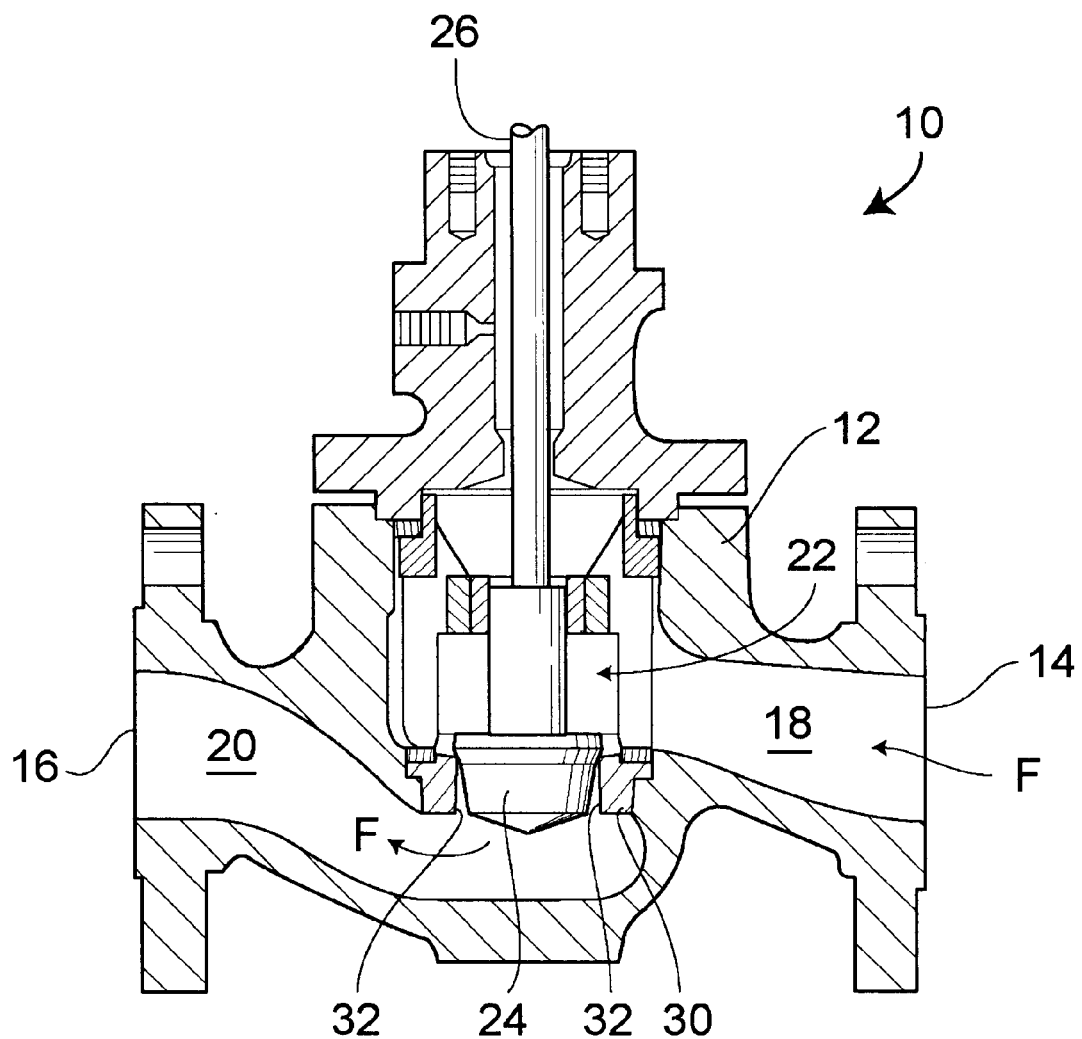
FIG. 1 is a longitudinal section of an exemplary prior art valve.

Referring now to the drawings, FIG. 1 shows one example of a prior art valve construction over which the variable port valve plug disclosed herein is a significant improvement. The prior art valve assembly 10 has a valve body 12 with a media inlet 14 at one end and a media outlet 16 at an opposite end. The media inlet communicates with an inlet passageway 18 and the media outlet communicates with an outlet passageway 20. Each of the inlet and outlet passageways 18 and 20, respectively, generally meet within the valve body and are in communication with one another through an orifice region 22.

The valve 10 can have a valve plug 24 coupled to a valve stem 26 at one end. The valve stem 26 is coupled at its opposite end to an actuator (not shown). The plug and stem can be moved along a longitudinal axis of the stem by the actuator between a valve closed and a valve open position. In the valve closed position as shown in FIG. 1, the plug 24 seats against a valve seat 30 disposed in the orifice region 22. move the valve stem and plug. The valve seat ring 30 defines an orifice 32 that is closed off by the valve plug in the valve closed position and that is open to flow of media when the plug is in the valve open position.

As discussed above, in order to change flow capacity for this valve, at least the trim set (plug and seat) must be removed and replaced. If the valve plug 24 travel is limited to a shorter maximum travel position, it will be positioned closer to the seat. In this condition, a media flowing in the direction of the arrow 'F' will tend to force or suck the valve plug toward the seat. This will either cause the plug to prematurely close against the valve seat 30 or at least obstruct flow through the orifice region 22. This obstruction will cause bi-stable flow and vibration within the valve 10 which can prematurely wear the stem, seat, and/or plug, or otherwise damage the valve. This also can cause variable flow rates through the valve and other dynamic flow problems. If a reduced valve flow capacity is desired, it is necessary to replace either the trim set including the plug 24 and the seat 30, or the entire valve 10.

The disclosed variable port valve plug, constructed in accordance with the teachings of the present invention, eliminates the need to change a valve trim set in order to vary the flow capacity of a given valve. FIGS. 2–5 illustrate an exemplary orifice region 50 shown in section view. The orifice region 50 replaces the region 22 described above for the valve 10 of FIG. 1. The basic valve components of the valve as depicted in FIGS. 2–5 are substantially the same, unless noted otherwise below.

The orifice region 50 in the disclosed example is for a sliding stem valve with a valve body 52 defining a media inlet (not shown) at one end and a media outlet (not shown) at an opposite end. The media inlet opens to an inlet passageway 54 and the outlet passageway 56 terminates at the media outlet. Each of the inlet and outlet passageways 54 and 56, respectively, meet generally within the valve body 52 and communicate with one another through the orifice region 50.

The orifice region 50 has a variable port valve plug 60 constructed in accordance with the teachings of the present invention, which is different than the valve plug 24 described above with regard to FIG. 1. The valve plug 60 is coupled to a valve stem 62 at one end. The valve stem 62 is coupled at its opposite end to an actuator (not shown) that can move the valve stem and plug along a longitudinal axis of the stem between a valve closed position (see FIG. 5) and a selected one of a plurality of different maximum open positions (see FIGS. 2–4 and description below). The valve plug 60 bears against a valve seat ring 70 when in the valve closed position. The valve seat ring is installed in the orifice region 50 and defines a flow orifice 72. During operation of the disclosed valve, the actuator (not shown) moves the valve stem 62 and valve plug 60 toward and away from a seating surface 74 of the seat ring 70 to close and open, respectively, the valve to permit a media to flow from the inlet to the outlet through the passageways and the flow orifice.

Figure 5:
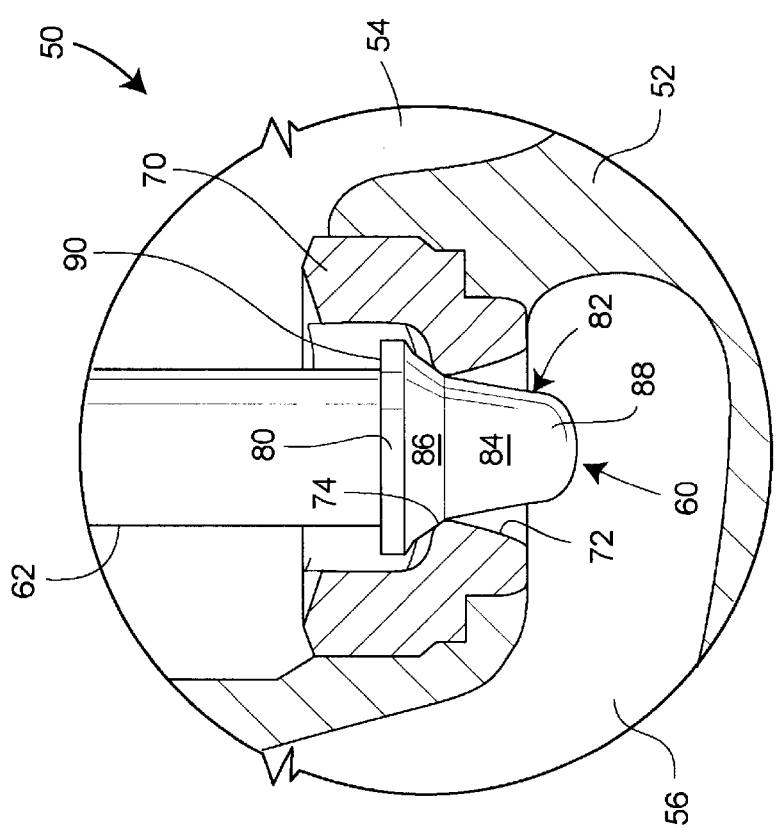
FIG. 5 is an enlarged view of the valve section shown in FIG. 2 wherein the valve plug is in a valve closed positioned.

In accordance with the teachings of the present invention and as best shown in FIG. 5, the variable port valve plug 60 has an annular shoulder 80 adjacent the end of the stem 62 coupled to the plug. The stem diameter is only slightly smaller than the shaped body section 82 with an exterior circumferential wall 84 that is tapered and gradually decreases in diameter moving away from the shoulder 80. A tapered or angled transition surface 86 extends between and interconnects the shoulder 80 and the wall 84 of the plug 80. The transition surface 86 is more sharply angled or tapered than the wall 84. A distal end of the valve plug 60 opposite the shoulder 80 is a smooth, curved or domed end surface 88 and transitions smoothly into the wall 84 of the body 82. The combination of the smooth tapered wall 84, transition surface 86, and domed end 88 provides smooth, gradually changing flow characteristics over the plug 60.

As shown in FIG. 5, when the variable port valve plug 60 is in the valve closed position, the tapered surface 86 adjacent the shoulder 80 bears against the seating surface 74 of the seat ring 70. The diameter of the shoulder 80 and the widest part of the angled surface 86 prevent the valve plug from passing through the flow orifice 72 of the seat ring, and thus closes of the orifice when in the valve closed position.

The small difference in diameter between the shoulder 80 and the stem 62 assists in preventing cavitation or turbulent flow of a media, such as a fluid, passing through the orifice region 50 over the shoulder end of the plug 60. The small diameter difference between stem and an exposed, unbalanced portion 90 of the shoulder 80 also helps to minimize a force applied by the media flowing through the orifice region 50 and downward onto the unbalanced portion 90. The small diameter of the shoulder 80, the small exposed area of the unbalanced portion 90, the smooth and tapered surfaces 86 and 84, and the domed distal end 88 of the valve plug body 82 in combination assist in preventing bi-stable flow through the orifice region 50 regardless of the position of the valve plug 60 relative the seat ring 70 when not in the valve closed position. These features permit altering the valve flow capacity as described below without changing the trim set or replacing the valve altogether. The exposed, unbalanced portion 90 of the shoulder 80, however small, can also be angled or curved to further reduce effects on media flow at the attachment region between the stem 62 and the plug 60.

An actuator and adjustment mechanism (not shown) can be positioned near the end of the stem opposite the plug 60. The mechanism can be used to select and set a desired maximum travel limit for the valve stem 62 and plug 60. The mechanism can be designed to provide a plurality of different and selectable maximum travel positions or full open positions for the valve plug. The variable port plug 60 disclosed herein permits such adjustment to change the valve flow capacity without negatively affecting flow characteristics through the orifice region 50.

Figure 2:
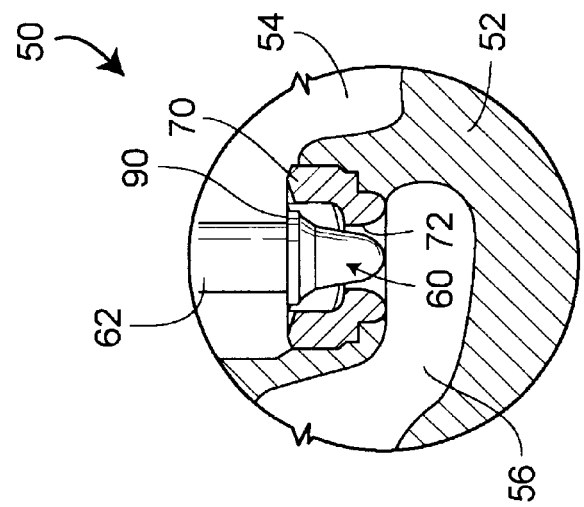
FIG. 2 is a longitudinal section of one example of a valve including a variable port valve plug constructed in accordance with the teachings of the present invention and positioned in a first flow capacity position.

For example, FIG. 2 illustrates the plug 60 positioned in a first selectable full open travel position relative to the seat 70. The mechanism (not shown) can be such that the plug 60 can travel no further from the seat ring 70 upon reaching the selected full open position. In this example, the plug body 82 is completely clear of the flow orifice 72 and valve seating surface or valve seat 74 of the seat ring 70. This position provides free flow through the orifice 72 of this valve. To illustrate, if the orifice 72 has a one-half inch port diameter, the orifice region 50 shown in FIG. 2 for a valve of a given geometry may have a valve flow coefficient of six (6) Cv with the plug fully open.

Figure 3:
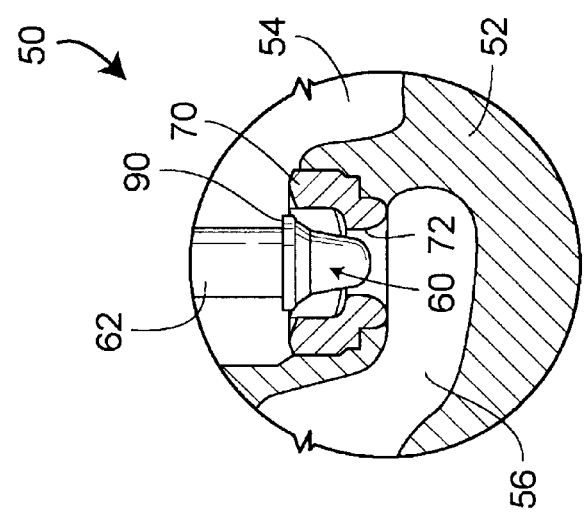
FIG. 3 is a longitudinal section of the valve shown in FIG. 2 wherein the valve plug is disposed in a different flow capacity position.

The actuator and adjustment mechanism can be manipulated to reset the plug travel limit or full open position. As shown in FIG. 3, the plug 60 is in a second selectable full open position wherein the plug is closer to the seat ring 70 than as shown in FIG. 2. In FIG. 3, at least the distal or domed end 88 extends partly into the flow orifice 72 of the seat ring 70. Another way to describe this position would be that the domed surface 88 at least partly breaks a plane of the seating surface 74. The smaller diameter of the plug wall 84 near the distal end 88 permits a media to pass through the one-half inch orifice 72 of the seat ring, but effectively reduces the flow capacity of the valve. As an example, with the plug 60 in the position of FIG. 3, the valve will have a flow capacity or coefficient of four (4) Cv. This will simulate the same valve with a three-eighths inch port diameter, even though the seat ring has not been replaced and still has a one-half inch port diameter. The smooth, elongate, and tapered shape of the plug 60 permits achieving this result without replacing the trim set and without negatively affecting the flow characteristics through the orifice region 50.

Figure 4:
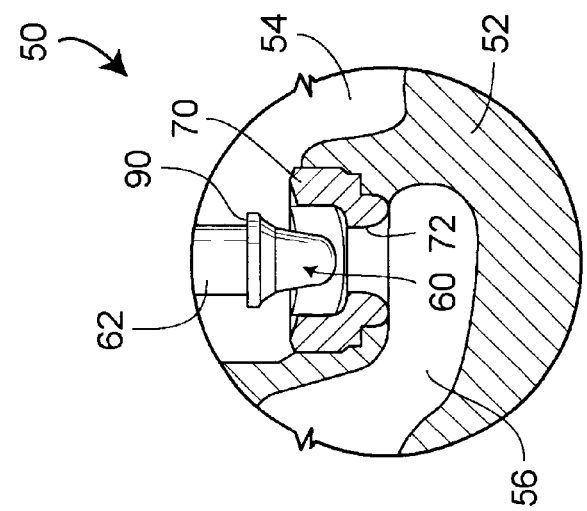
FIG. 4 is a longitudinal section of the valve shown in FIGS. 1 and 2 wherein the valve plug is disposed in yet another flow capacity position.

FIG. 4 illustrates a third, further limited, maximum or full open position for the plug 60 that is even less than the first and second selectable positions noted previously. In this example, a substantial portion of the plug body 82 extends into the orifice 72 of the seat ring 70. Again, the reduced or tapered diameter of the wall 84 permits a media to pass through the orifice though at a still further limited capacity. In this example, utilizing the same plug 60 and seat ring 70, a flow characteristic for the same valve through the orifice region 50 can simulate a quarter-inch port diameter, resulting in a flow capacity or coefficient of, for example, two (2) Cv without changing the trim set. Other intermediate positions can also be accommodated, depending on the particular plug and seat ring/orifice design configuration. For example, the plug 60 can extend into the orifice with either more or less than a majority of the wall or surface 84 within the orifice of braking the seating surface plane.

The plug contour and configuration permits adjusting the maximum travel position of the valve plug to achieve an adjustable or variable port feature for the valve without changing the trim set. The degree of taper and/or curvature of the body wall 84, domed end 88, and transition surface 86 can be altered, as can the size of the flow orifice of the seat ring 70 in order to achieve desired flow characteristic for a valve. However, the plug 60 disclosed herein permits adjusting the maximum travel limit without creating bi-stable flow or vibration in the valve orifice region 50, as would be generated by prior art seat and plug designs.

Although certain variable port valve plugs have been disclosed and described herein in accordance with the teachings of the present invention, the scope of coverage of this patent is not limited thereto. On the contrary, this patent covers all embodiments of the teachings of the invention that fairly fall within the scope of permissible equivalents.

What is claimed is:

1. A valve assembly comprising:
 a valve body having an inlet passageway and an outlet passageway;
 a flow orifice disposed within an orifice region of the valve body and providing flow communication between the inlet passageway and outlet passageway;
 a variable port valve plug including a plug body with a conically-shaped smooth tapered wall, a proximal end connected to a movable part of the valve assembly, and a domed distal end surface that smoothly transitions into the tapered wall, wherein the valve plug is connected to a solid valve stem and is movable between an open position out of contact with the valve seat and a closed position borne against the valve seat, and wherein a maximum travel position of the valve plug relative to the valve seat in the open position can be selectively changed to vary a flow capacity of the valve assembly; and
 a valve seat having a first end, a second end, and a seating surface positioned between the first and second ends, the valve seat having an outwardly tapered surface extending from the seating surface toward the first end, the second end of the valve seat extending past the proximal end of the valve body toward the solid valve stem when the valve is in the closed position.

2. A valve assembly according to claim 1, the movable part of the valve assembly is a slidable valve stem.

3. A valve assembly according to claim 1, wherein the movable part of the valve assembly is the valve stem, and wherein the proximal end of the valve plug is connected to one end of the valve stem.

4. A valve assembly according to claim 1, wherein the maximum travel position can be selected from a plurality of discrete maximum open positions.

5. A valve assembly according to claim 4, wherein the plurality of maximum open positions includes at least one selectable position wherein the entire plug body is spaced a distance from a plane of the valve seat in a direction relative to the open position.

6. A valve assembly according to claim 4, wherein the plurality of maximum open positions includes at least one selectable position wherein at least part of the domed end surface of the plug body breaks a plane of the valve seat in a direction relative to the closed position.

7. A valve assembly according to claim 4, wherein the plurality of maximum open positions includes at least one selectable position wherein the domed end surface and at least part of the tapered wall of the plug body breaks a plane of the valve seat in a direction relative to the closed position.

8. A valve assembly according to claim 4, wherein the plurality of maximum open positions includes at least one selectable position wherein the domed end surface and a majority of the tapered wall of the plug body breaks a plane of the valve seat in a direction relative to the closed position.

9. A valve assembly comprising:
 a valve body having an inlet passageway and an outlet passageway;
 a flow orifice disposed within an orifice region of the valve body and providing flow communication between the inlet passageway and outlet passageway;
 a variable port valve plug including a plug body with a conically-shaped smooth tapered wall, a proximal end connected to a movable part of the valve assembly, and a domed distal end surface that smoothly transitions into the tapered wall, wherein the valve plug is connected to a solid valve stem and is movable between an open position out of contact with the valve seat and a closed position borne against the valve seat, and wherein a maximum open position of the valve plug relative to the valve seat can be selectively changed to vary flow characteristics through the valve assembly; and a valve seat positioned in the orifice region at an upstream end of the flow orifice, the valve seat having an outwardly tapered wall on one end, and a substantially cylindrical wall on an opposing end extending past the solid proximal end of the valve plug toward the valve stem when the valve plug is in the seated position.

10. A valve assembly according to claim 9, wherein the movable part of the valve assembly is the valve stem, and wherein the proximal end of the valve plug is connected to one end of the valve stem.

11. A valve assembly according to claim 9, wherein the maximum open position is altered and selected from a plurality of discrete open positions.

12. A valve assembly according to claim 11, wherein the plurality of discrete open positions includes at least one selectable position wherein the entire plug body is positioned outside of the flow orifice.

13. A valve assembly according to claim 11, wherein the plurality of discrete open positions includes at least one selectable position wherein at least part of the domed end surface of the plug body is positioned within the flow orifice.

14. A valve assembly according to claim 11, wherein the plurality of discrete open positions includes at least one selectable position wherein the domed end surface and at least part of the tapered wall of the plug body are positioned within the flow orifice.

15. A valve assembly according to claim 11, wherein the plurality of discrete open positions includes at least one selectable position wherein the domed end surface and a majority of the tapered wall of the plug body are positioned within the flow orifice.

16. A method of selectively controlling flow characteristics of a valve assembly having a valve body with an inlet passageway, an outlet passageway, a flow orifice disposed within the valve body between the inlet passageway and outlet passageway, and a valve seat positioned at an upstream end of the flow orifice, the method comprising the steps of:

providing a variable port valve plug connected to a solid valve stem, the plug having a plug body with a conically-shaped smooth tapered wall, a proximal end, and a domed distal end surface that smoothly transitions into the tapered wall;

forming an end of the valve seat to extend past the proximal end of the valve plug toward the solid valve stem when the valve plug is in the closed position for increasing the length of the flow orifice region when the valve is moved between the fully open and fully closed positions;

coupling the proximal end of the valve plug to a movable part of the valve assembly such that the valve plug is movable between an open position out of contact with the valve seat and a closed position borne against the valve seat;

determining a desired flow capacity for the valve assembly; and selecting one valve plug discrete open position that corresponds to the desired flow capacity from a plurality of different selectable maximum open positions.

* * * * *

UNITED STATES PATENT AND TRADEMARK OFFICE
CERTIFICATE OF CORRECTION

PATENT NO. : 6,769,666 B2
DATED : August 3, 2004
INVENTOR(S) : Randy J. Hall et al.

It is certified that error appears in the above-identified patent and that said Letters Patent is hereby corrected as shown below:

Column 2,
Line 50, please change "positioned" to -- position --.

Column 3,
Line 30, please delete "move the valve stem and plug.".

Column 4,
Line 42, please change "closes of the orifice" to -- closes off the orifice --.

Column 7,
Lines 15-16, please delete "solid proximal end of the valve plug toward the valve stem" and insert -- proximal end of the valve plug toward the solid valve stem --.

Signed and Sealed this

Eleventh Day of October, 2005

JON W. DUDAS
*Director of the United States Patent and Trademark Office*